L. DAGUE.
Seeders, Plaster-Sowers and Harrows.

No. 157,159.  Patented Nov. 24, 1874.

UNITED STATES PATENT OFFICE.

LEVI DAGUE, OF SHERWOOD, MICHIGAN.

IMPROVEMENT IN SEEDERS, PLASTER-SOWERS, AND HARROWS.

Specification forming part of Letters Patent No. 157,159, dated November 24, 1874; application filed February 24, 1874.

*To all whom it may concern:*

Be it known that I, LEVI DAGUE, of Sherwood, in the county of Branch and State of Michigan, have invented an Improvement in Broadcast Seeders, Plaster-Sowers, and Drags Combined, of which the following is a specification:

The nature of this invention relates to an implement provided with a broadcast seeder, a cylinder for sowing plaster and other pulverized manures, and a drag for harrowing them in; and it consists in the peculiar construction and arrangement of the several parts, as more fully hereinafter set forth.

Figure 1:
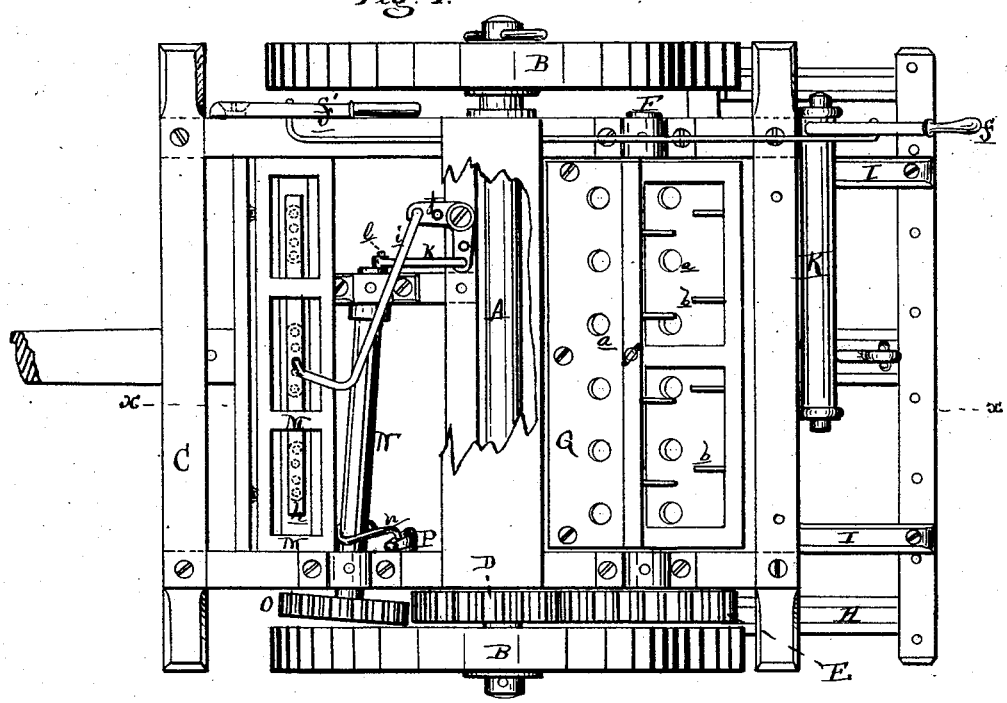
Figure 2:
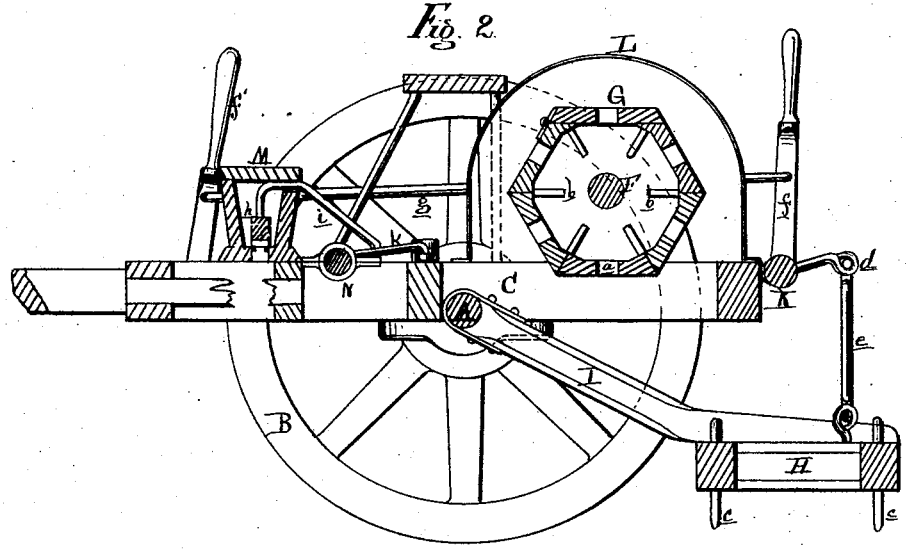

Figure 1 is a plan view. Fig. 2 is a cross-section at $x\ x$.

In the drawing, A represents a round iron axle, upon the arms of which the traction-wheels B B are mounted, the left wheel being keyed fast on the arm, while the right wheel is sleeved on its arm. C is a frame with suitable boxes under the middle of each side, through which the axle is journaled. D is a spur-gear secured on the axle between the left wheel and the frame, meshing with a pinion, E, on a shaft, F, journaled in brackets across the rear part of the frame, and carrying a polygonal drum, G, perforated with apertures $a$ for the emission of plaster or other fertilizer, provided with internal studs $b$ for breaking up the lumps, and a hinged door, (shown open in Fig. 1.) H is a frame armed with harrow-teeth $c$, to form a drag for working the seed and fertilizer into the ground. It is connected to the axle by a draw-bar, I, at each side, strapped to said axle. It is connected to an arm, $d$, on a rock-shaft, K, by a link, $e$. The lever $f$ of said rock-shaft is connected to a lever, $f'$, at the front of the frame within easy reach of the driver by a rod, $g$. By pushing forward the lever $f'$ the driver can lift the drag to clear an obstruction. A sheet-metal shield, L, incloses the drum G, to prevent the contents of the drum from flying about. Across the fore part of the frame is placed a seed-box, M, having a perforated bottom, on which rests a vibrating slide, $h$, to which is pivoted one end of a rod, $i$, bent to the form shown, its other end being pivoted to a bell-crank, $j$, pivoted at its angle to the central cross-bar of the main frame. To the other arm of said bell-crank is pivoted one end of a connecting-rod, $k$, whose front end is strapped on a crank-pin, $l$, on the end of a shaft N, journaled in boxes $m\ m'$ on the longitudinal bars of the main frame, the outer box having a slight longitudinal movement; or, if preferred, the shaft may move to and fro in the box, as shown, to throw a pinion, O, at the end of the shaft, in or out of gear with the spur-gear D, and thus vibrate or arrest the slide-dropper $h$. The shaft N is moved by a rod, $h$, encircling it near the outer box, and pivoted at its rear end to a lever, P, at the left side of the frame. (Shown in plan in Fig. 1.)

With this machine seeds and fertilizers can be sown together, or either independently of the other, and harrowed in as fast as sown.

Q is a seat for the driver.

What I claim as my invention, and desire to secure by Letters Patent, is—

1. In a single machine, the combination of a perforated agitator, G, provided with internal studs $b$, the spur-gear E, meshing with the spur-gear D on a shaft, A, the spur-gear O, shaft N, rod $k$, bell-crank $j$, rod $i$, operating the seed-hopper M, and the drag H, all constructed and arranged substantially as described and shown.

2. In combination, the shaft N, having a pinion, O, adapted to be thrown in or out of gear with the spur-gear D by the lever P, the said shaft moving longitudinally in one of its axle-boxes, and operating the slide $h$ of the seed-box by means of the rod $k$, fastened to its inner end, bell-crank $j$, and rod $i$, all constructed and arranged to operate substantially as described and shown.

LEVI DAGUE.

Witnesses:
ISAAC SAWN,
MANTON E. LAVIN.